United States Patent [19]

Atwood

[11] Patent Number: 5,503,861
[45] Date of Patent: Apr. 2, 1996

[54] METHOD AND APPARATUS FOR LUBRICATING DOUGH DIVIDERS

[75] Inventor: Thomas A. Atwood, Dolton, Ill.

[73] Assignee: AM Manufacturing Company, Dolton, Ill.

[21] Appl. No.: 208,228

[22] Filed: Mar. 10, 1994

[51] Int. Cl.$^6$ ............................................. A21C 5/00
[52] U.S. Cl. ........................ 426/503; 426/512; 426/518; 425/238; 425/239; 92/153; 92/160
[58] Field of Search ..................... 426/503, 512, 426/518; 425/238, 239; 92/153, 160

[56] References Cited

U.S. PATENT DOCUMENTS

| | | | |
|---|---|---|---|
| 1,523,605 | 1/1925 | Mueller | 92/153 X |
| 1,559,805 | 11/1925 | Streich | 425/238 |
| 2,007,686 | 7/1935 | Marasso | 425/238 |
| 2,038,733 | 4/1936 | Harber et al. | 425/238 |
| 2,104,432 | 1/1938 | Marasso | 425/238 |
| 2,232,653 | 2/1941 | Cunningham | 425/238 |
| 2,270,512 | 1/1942 | Devlin | 425/238 |
| 2,638,066 | 5/1953 | De Ridder | 425/238 |
| 2,902,950 | 9/1959 | Valentyne et al. | 425/238 X |
| 3,311,068 | 3/1967 | Atwood et al. | 425/238 |
| 3,364,879 | 1/1968 | Atwood | 91/254 |
| 3,578,218 | 5/1971 | Atwood | 222/383 |
| 4,177,030 | 12/1979 | Seiling | 426/503 X |
| 4,513,614 | 4/1985 | Adcock | 426/503 X |
| 4,573,898 | 3/1986 | Jone et al. | 425/239 X |
| 4,623,455 | 11/1986 | Adcock | 210/168 |
| 4,676,727 | 1/1987 | Atwood | 425/238 X |
| 4,731,007 | 3/1988 | Schiek | 426/503 X |
| 4,753,742 | 6/1988 | Wilhelm, Jr. | 252/32.5 |
| 4,776,785 | 10/1988 | Jone et al. | 425/239 |
| 5,211,968 | 5/1993 | Judex | 425/238 |
| 5,269,674 | 12/1993 | Skoog et al. | 425/238 |

Primary Examiner—Donald E. Czaja
Assistant Examiner—Milton I. Cano
Attorney, Agent, or Firm—Hill, Steadman & Simpson

[57] ABSTRACT

A dough divider is provided having a piston and cylinder mechanism for repeatedly pressing dough into a measuring cup assembly. Dough is drawn from a hopper into the cylinder through a tube. A lubrication port is disposed in the tube, and a channel extends from the port to the cylinder. The port and channel arrangement provide a self-cleaning lubricating arrangement which keeps the dough from sticking.

20 Claims, 3 Drawing Sheets

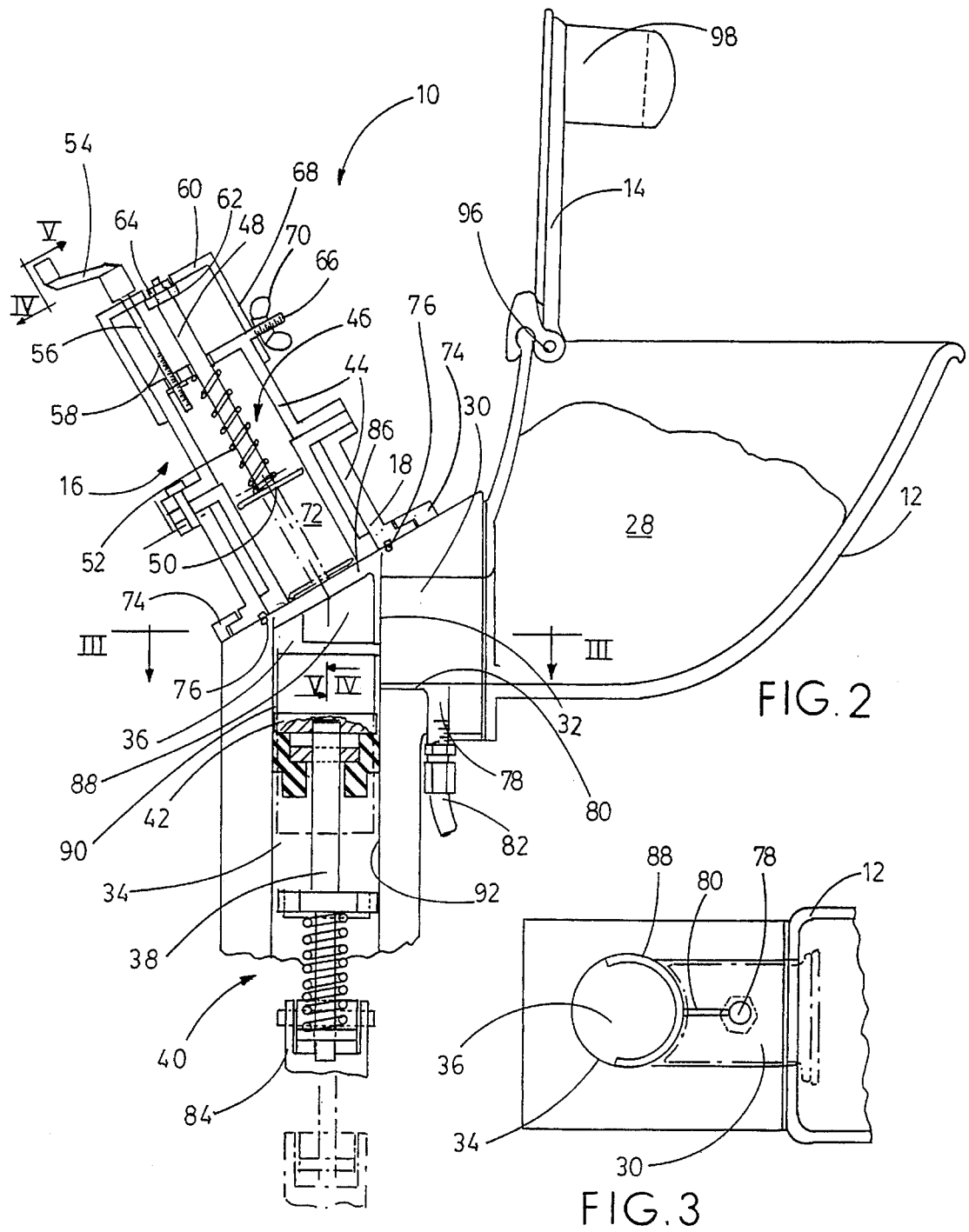

5,503,861

METHOD AND APPARATUS FOR LUBRICATING DOUGH DIVIDERS

BACKGROUND OF THE INVENTION

The present invention generally relates to dough processing machines. More specifically, the invention relates to a machine that divides a mass of dough into smaller uniform quantities. The invention provides an improvement to such a machine.

For producing baked products in large quantities, bakeries use machinery for automating various processes. For instance, various equipment is used for manipulating dough. One such machine is a dough divider, which apportions a large quantity of dough into slugs of smaller, uniform amounts of dough. These slugs of dough can then be formed and cooked into bagels, rolls, pitas, pizza crusts or a variety of other baked goods.

A dough divider can be arranged with other equipment. For example, a dough divider can be arranged so that the output goes into a dough rounder, which forms a slug of dough into a rounded shape. Slugs of dough can also be placed in a roller device for shaping bagels. Conveyor belts are often used for carrying dough from one machine to another for performing various processes.

A dough divider has a reciprocating plastic piston which draws dough from a reservoir into a metal cylinder through a tube on a piston downstroke. The piston then pushes the dough into a measuring cup from which a measured amount of dough, or slug, is removed. The process repeats, dividing dough into multiple smaller, uniform slugs.

Dough is a substance which can stick to metal and plastic surfaces, such as the piston and cylinder components of a dough divider. Such sticking can cause a dough divider to become bogged down, requiring cleaning before continued use. Furthermore, in a processing line of automated equipment, an entire processing line can be halted if a dough divider must be cleaned frequently.

To help prevent dough from sticking to the parts inside a dough divider, oil can be injected to provide lubrication of the dough contacting parts such as the piston and cylinder. In known dough dividers, oil has been injected through a port in the vertical cylinder wall. However, a port in that location can become clogged with dough, blocking the injection of oil and requiring cleaning before the divider can continue operating. A need, therefore, exists for a dough divider with a lubrication system which is resistant to clogging.

SUMMARY OF THE INVENTION

The present invention provides a system and method for internally lubricating a dough divider to reduce the sticking of dough to mechanical components. In this regard, the present invention includes a lubrication port having an improved location in combination with a self cleaning channel. This arrangement prevents clogging while providing adequate lubrication.

To this end, an apparatus for dividing dough is provided. The apparatus has a piston, a cylinder, and a passage or tube leading from a dough reservoir and which has an opening into the cylinder. A port is located in the tube for injecting a lubricant. There is a channel in the tube extending from the port to the cylinder. The piston can reciprocate within the cylinder to draw dough into the cylinder through the tube. The lubricant prevents the dough from sticking to the piston and cylinder.

In an embodiment of the present invention, an annular recess is provided around the piston. The recess passes the channel as the piston reciprocates. As the recess passes the channel, lubricant can be received into the channel.

In an embodiment of the present invention, a reservoir in the form of a hopper is provided adjacent to the tube for holding a quantity of dough to be provided to the tube for dividing.

In an embodiment of the present invention, a measuring cup is provided for receiving a quantity of dough from the cylinder. The piston presses the quantity of dough into the measuring cup.

In an embodiment of the present invention, the tube and the cylinder are constructed of metal.

In an embodiment of the present invention, the piston is constructed of plastic.

In an embodiment of the present invention, the lubricant is edible.

In an embodiment of the present invention, the lubricant is mineral oil.

In an embodiment of the present invention, the cylinder is oriented vertically and the tube is generally perpendicular thereto. The piston is arranged to press the dough upward in the cylinder. The channel generally terminates at a bottom of the opening.

In accordance with the present invention, a dough dividing machine is provided. A means is provided for drawing dough through a tube into a chamber. The tube has an opening into the chamber. A means is provided for pressing the dough from the chamber. A port is located in the tube for injecting a lubricant. A channel extends from the port to the opening. The lubricant prevents the dough from sticking to the machine.

In a related embodiment of the present invention, a means is provided for measuring an amount of dough. The means for pressing causes dough to be received by the means for measuring.

The present invention also provides a method of dividing dough. Dough is drawn through a tube into a cylinder. An apportionment of dough is pressed from the cylinder with a reciprocating piston. A lubricant is injected from a port located in the tube. A channel extends from the port to the cylinder.

In an embodiment of the present invention, the apportionment of dough is received into a measuring cup.

In an embodiment of the present invention, the measuring cup containing the apportionment of dough moves on a slide. The apportionment of dough is then released from the measuring cup.

In an embodiment of the present invention, dough is supplied in a hopper to be drawn into the tube.

An advantage of the present invention is that it adequately lubricates dough and the components of a dough dividing machine to prevent the dough from sticking to the components.

Another advantage of the present invention is that it provides a means of lubricating a dough divider which resists clogging.

A further advantage of the present invention is that it provides a means of lubricating a dough divider which is self-cleaning.

Additional features and advantages of the present invention are described in, and will be apparent from, the detailed

BRIEF DESCRIPTION OF THE DRAWINGS

FIG. 2 illustrates a partial, fragmentary, sectional side view of a dough divider.

FIG. 3 illustrates a fragmentary, sectional top view taken generally along line III—III of FIG. 2.

DETAILED DESCRIPTION OF THE PRESENTLY PREFERRED EMBODIMENTS

In accordance with the invention described with reference to accompanying figures wherein like numerals designate like parts, the present invention provides an improved means for lubricating a dough divider to prevent dough from sticking thereto. The device of the present invention provides continued lubrication without clogging.

Figure 1:
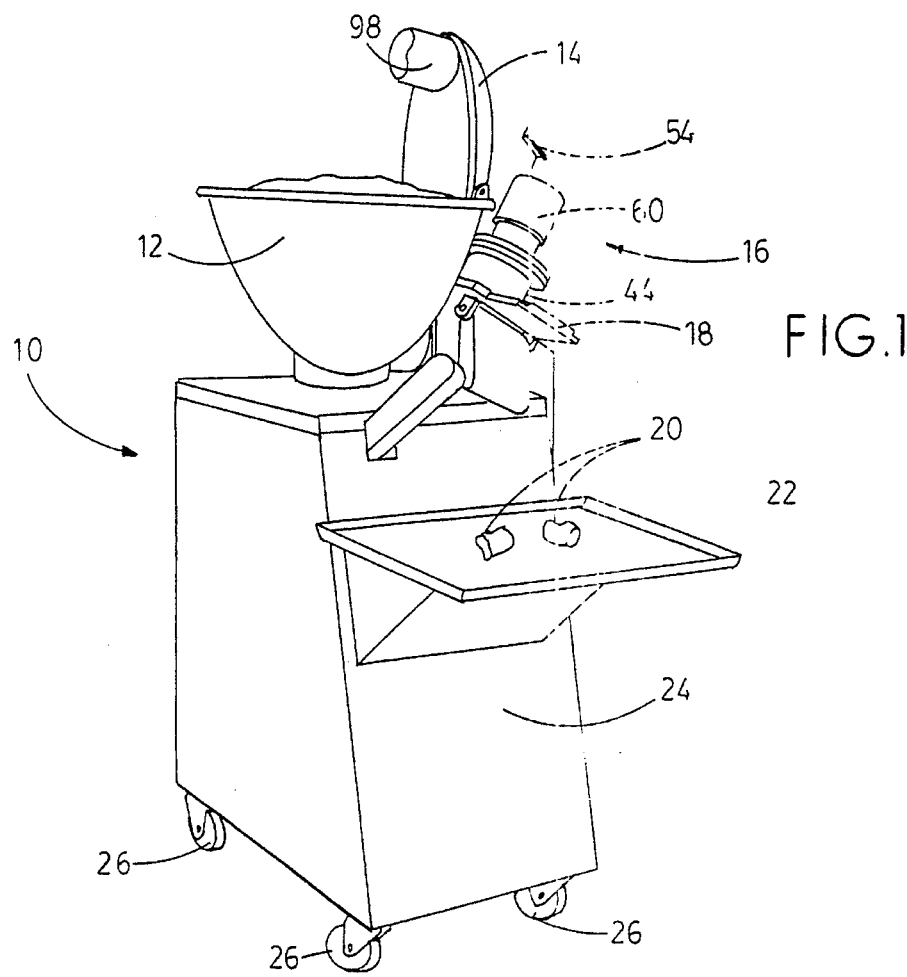
FIG. 1 illustrates a perspective view of a dough divider.

FIG. 1 illustrates a dough divider 10 which embodies the features of the present invention. A reservoir in the form of a hopper 12 is provided for holding a large quantity of dough. The hopper 12 has a hinged cover 14. Also illustrated in FIG. 1 is a measuring cup assembly 16. The measuring cup assembly 16 is mounted on a slide 18. During operation, uniform slugs 20 of dough are released from the measuring cup assembly 16. In the embodiment shown, the slugs 20 are collected on a tray 22. Alternatively, the slugs 20 could be dropped from the measuring cup assembly 16 onto a conveyor belt which could carry them to another processing machine (not shown). The slugs 20 are small relative to the amount of dough that can be placed in the hopper 12. Some operating parts of the dough divider 10 are enclosed in a cabinet 24. Wheels 26 are provided on the cabinet 24 for moving the divider 10.

As illustrated in FIG. 2, the bottom of the hopper 12 is formed to enter a passage in the form of a tube 30. The hopper 12 is shown holding dough 28. The tube 30 terminates at an opening 32 to a chamber such as a cylinder 34. The hopper 12 is thus in communication with the cylinder 34. The cylinder 34 is preferably aligned vertically, and the tube 30 is preferably aligned generally perpendicularly to the cylinder 34. The cylinder 34, tube 30, and hopper 12 are preferably made of metal.

A piston 36 is slidable within the cylinder 34. The piston 36 is preferably made of plastic. The piston 36 is secured to a connecting rod 38. The connecting rod 38 preferably has a spring-biased telescoping section 40. A piston ring 42 is disposed around the piston 36, forming a seal between the piston 36 and the cylinder 34.

Atop the cylinder 34, the measuring cup assembly 16 is mounted. The measuring cup assembly 16 includes a cylindrical housing 44 and an adjustable plunger 46. The plunger 46 has a stem 48 and a face 50. The plunger 46 can slide axially within the cylindrical housing 44 and is biased by a spring 52 so that the plunger face 50 is normally flush with the top of the cylinder 34. The plunger 46 can recede in the cylindrical housing 44 against the force of the spring 52. The plunger travel is limited. A crank 54 is connected to a shaft 56 which extends through a stop cup 60 to the cylindrical housing 44. A threaded portion 58 of the shaft 56 extends through the cylindrical housing 44. The stop cup 60 is slidable over the outside of the cylindrical housing 44. The plunger stem 48 preferably has a nut 62 secured thereto for contacting the stop cup 60 to stop plunger travel. The nut 62 can be secured by a lock nut 64. By rotating the crank 54, the stop cup 60 can be slid relative to the cylindrical housing 44. A threaded member 66 extends from the cylindrical housing 44 through a slot 68 on the stop cup 60. A wing nut 70 is provided on the threaded member 66 so that the stop cup 60 can be locked in a desired position. When the plunger 46 is in a fully receded position, such that the nut 62 contacts the stop cup 60, a measuring chamber 72 is formed by a volume within the cylindrical housing 44 between the plunger face 50 and the bottom of the cylindrical housing 44.

The measuring cup assembly 16 is mounted to the slide 18 which is secured to the divider 10 by bars 74 having an L-shaped cross-section. Slide seals 76 are positioned between the slide 18 and the cylinder 34. The measuring cup assembly 16 is preferably mounted at an angle to the cylinder 34.

A lubrication port 78 is disposed in the bottom of the tube 30. A channel 80 in the bottom of the tube 30 extends from the port 78 to the cylinder 34. The port 78 is in communication with a lubricant supply line 82. FIG. 3 also illustrates the position of the port 78 and the channel 80 in the bottom of the tube 30.

The piston ring 42 and slide seals 76 make the cylinder 34 airtight. The dough 28 in the hopper 12 forms an airtight seal around the tube 30. In operation-, a linkage 84 causes the connecting rod 38 and piston 36 to reciprocate up and down within the cylinder 34. As the piston 36 travels downward, a vacuum is formed, drawing dough 28 from the hopper 12 through the tube 30 into the cylinder 34. When the piston 36 is in its bottommost position, the entire cylinder 34 is filled with dough 28. The piston 36 then travels upward, pushing dough 28 through the cylinder 34 toward the measuring cup assembly 16. Pressure from the dough 28 causes the plunger 46 to travel against the tension of the spring 52. The nut 62 on the plunger 46 contacts the adjustable stop cup 60 when the measuring chamber 72 has received a volume of dough 28 equal to the desired slug 20 size. The piston 36 continues its upward travel, forcing excess dough 28 to flow backward out of the cylinder 34, through the tube 30, into the hopper 12.

The piston 36 has a top 86 which is angled to affect a slicing action on the dough 28 as the piston 36 moves upward past the opening 32 to the tube 30. The piston 36 has a reduced-circumference section 88 near the top of the piston 36, adjacent to the opening 32. The reduced-circumference section 88 provides a flow path for excess dough 28 to escape from the cylinder 34 into the tube 30 as the dough 28 is being compressed by the piston 36. Furthermore, the reduced-circumference section 88 provides a degree of safety for an operator's fingers accidentally caught by the piston 36, preventing fingers from being severed.

The piston 36 travels upward to near the top of the cylinder 34. The linkage 84 may continue an upward travel for a short distance after the piston 36 has reached the top of its upstroke. This additional travel by the linkage 84 is absorbed by the telescoping section 40 of the connecting rod 38. This overtravel ensures that a sufficient volume of dough 28 is pressed into the measuring cup assembly 16.

Figure 5:
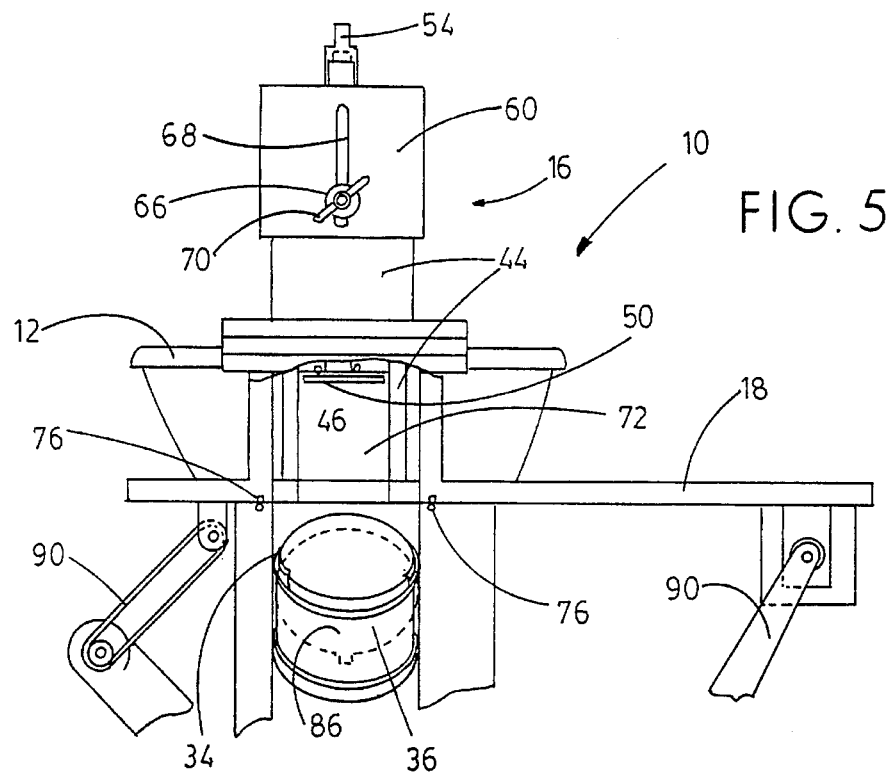
FIG. 5 illustrates a fragmentary, partial, sectional rear view taken generally along line V—V of FIG. 2.
Figure 4:
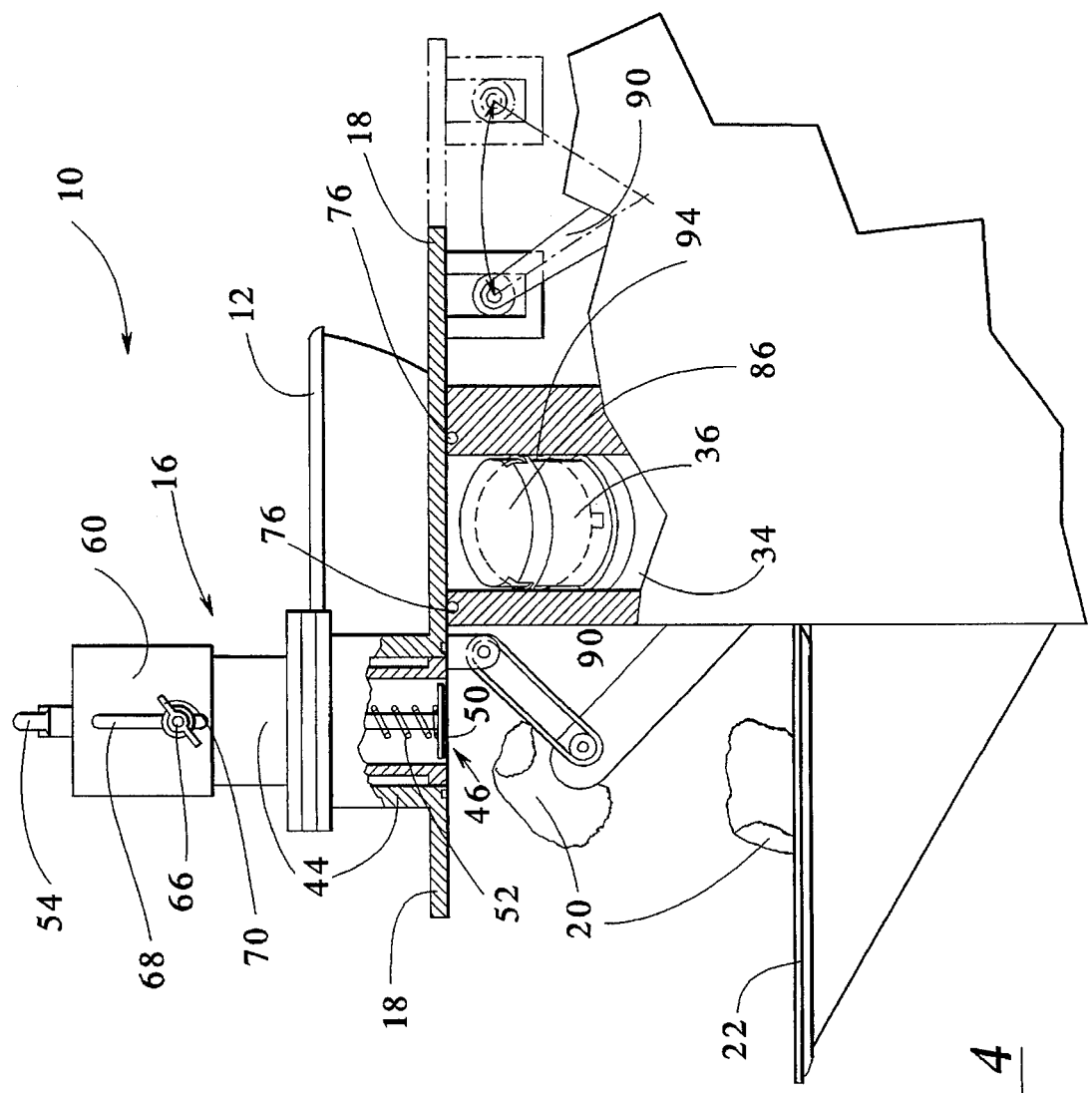
FIG. 4 illustrates a fragmentary, partial, sectional rear view of a dough divider taken generally along line IV—IV of FIG. 2.

While the piston 36 is positioned at the top of the cylinder 34, the slide 18 is moved laterally by mechanized arms 90 to a position which opens the bottom of the measuring cup assembly 16, as illustrated by FIG. 4. The spring 52 forces the plunger 46 to its normal position, dispensing the measured slug 20 of dough. The slug 20 falls from the measuring cup assembly 16 to a receptacle, such as the tray 22. The slide 18 is then moved back, as illustrated by FIG. 5, so that the measuring cup assembly 16 can receive more dough 28, repeating the process.

The key features of the present invention provide lubrication of the dough divider 10. Most dough compositions will stick to the plastic and metal components of a dough divider 10. Specifically, inadequate lubrication can cause dough 28 to stick to the piston 36, cylinder 34, and the components of the measuring cup assembly 16. Excessive sticking can cause the piston 36 to resist motion and become ineffective. Also, if dough becomes stuck in the measuring cup assembly 16, a slug 20 can fail to dispense. A slug 20 also might only partially dispense, leaving a quantity of dough within the cylindrical housing 44. That would result in an improperly sized slug 20 and cause the measuring cup assembly 16 to receive a less than desired volume of dough 28 on the next cycle. In the present arrangement, the port 78 and channel 80 provide an improved means of lubricating a dough divider 10. Particularly, the positioning of the port 78 and channel 80 within the tube 30 provide improved lubrication which prevent dough 28 from sticking to the piston 36, cylinder 34 and measuring cup assembly 16.

While the channel 80 illustrated extends the entire distance from the port 78 to the cylinder 34, it is within the scope of the present invention to have the channel 80 terminate short of the cylinder 34. In such a case, it is preferred that a bottom wall of the channel slope up to the wall forming the tube 30 such that dough 28 will not be trapped by any sharp edges or corners as it moves towards the cylinder 34.

On a piston downstroke, as dough 28 is sucked from the hopper 12 into the cylinder 34, dough 28 flows through the tube 30 from the right to the left as shown in FIG. 2. This flow is across the top of the port 78 and along the channel 80. Such a flow provides a self-cleaning action, preventing bits of dough 28 from clogging the port 78. The channel 80 is also self-cleaning, as dough 28 repeatedly flows in the direction from the port 78 to the cylinder 34 across the top of the channel 80. While excess dough 28 flows backward through the tube 30 when the piston 36 travels upward, the totality of dough 28 flows from the hopper 12 to the cylinder 34, resulting in the self-cleaning action.

Some lubricant is in direct contact with dough 28 as dough 28 moves across the port 78. The lubricant also flows through the channel 80 from the port 78 to the cylinder 34. This lubricant runs down the cylinder wall 92 and is worked around the piston 36 and cylinder 34 by the reciprocating piston action. The motion of dough 28 within the cylinder 34 also assists in spreading the lubricant.

The piston 36 preferably has an annular recess 94. This recess 94 can receive lubricant when it travels past the channel 80. Lubricant is then carried by the recess 94 as the piston 36 reciprocates, lubricating the cylinder 34.

The lubricant is preferably an edible mineral oil. The lubricant could be a variety of other lubricating fluids as well. However, the lubricant is preferably edible. The lubricant is provided at a low pressure through the lubricant supply line 82.

The hopper cover 14 provides safety features which protect an operator of the dough divider 10. The hopper cover 14 is connected to the hopper 12 by a hinge 96. Preferably, the hinge 96 includes a safety switch (not shown). The safety switch prevents operation of the dough divider 10 when the hopper cover is in the open position, as shown in FIGS. 1 and 2. Also, the hopper cover 14 preferably has an extension 98 which is shaped to be received into the tube 30. This allows an operator to safely push the last bit of dough 28 from the hopper 12 through the tube 30.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that changes and modifications be covered by the appended claims.

What is claimed is:

1. A dough processing apparatus comprising:

a means for drawing dough through a tube into a chamber, said tube opening into said chamber;

a means for pressing said dough from said chamber;

a port located in said tube at a distance from said chamber for injecting a lubricant, said port having a channel in fluid communication therewith, said channel extending along said distance from said port towards said chamber so that said lubricant prevents said dough from sticking to said chamber upon pressing said dough in said chamber.

2. A dough processing apparatus according to claim 1 further comprising a hopper adjacent to said tube for supplying said dough to said tube.

3. A dough processing apparatus according to claim 1 further comprising a means for measuring an amount of dough, wherein said means for pressing causes dough to be received by means for measuring.

4. A dough processing apparatus according to claim 1 wherein said lubricant is an edible mineral oil.

5. A dough processing apparatus according to claim 1 wherein said chamber is constructed of metal.

6. A dough processing apparatus according to claim 1 wherein said means for pressing comprises a piston mounted to reciprocate within said chamber.

7. A dough processing apparatus according to claim 6 further comprising a recess around said piston for receiving lubricant as said piston reciprocates.

8. A dough processing apparatus according to claim 6 wherein said piston is constructed of plastic.

9. An apparatus for dividing dough comprising:

a piston;

a cylinder;

a tube which opens into said cylinder, said piston being mounted to reciprocate within said cylinder to draw dough into said cylinder through said tube;

a port located in said tube for injecting a lubricant, said port being located a distance from said cylinder and having a channel in said tube, said channel being in fluid connection with said port and extending along said distance from said port to said cylinder for delivering a flow of said lubricant onto dough being drawn into said cylinder so that said lubricant prevents said dough from sticking to said piston and cylinder when said piston reciprocates.

10. An apparatus according to claim 9 wherein said channel extends from said port to said cylinder.

11. An apparatus according to claim 10 further comprising a recess around said piston, wherein said recess passes said channel as said piston reciprocates.

12. An apparatus according to claim 9 further comprising a hopper adjacent to said tube for holding a quantity of dough to be provided to said tube.

13. An apparatus according to claim 9 further comprising a measuring cup for receiving a quantity of dough from said cylinder, wherein said piston presses said quantity of dough into said measuring cup.

14. An apparatus according to claim 9 wherein said tube and said cylinder are constructed of metal.

15. An apparatus according to claim 9 wherein said piston is constructed of plastic.

16. An apparatus according to claim 9 wherein the lubricant is an edible mineral oil.

17. A method of dividing dough comprising the steps of:

drawing a portion of dough from a mass of dough through a tube into a cylinder;

pressing said portion of dough from said cylinder with a reciprocating piston, thereby separating said portion of dough from said mass of dough;

injecting a lubricant onto said dough from a port located in said tube, the port having a channel in fluid communication therewith, the channel extending along a distance from said port to said chamber; and delivering said lubricant along said channel into said cylinder during said drawing so that said lubricant prevents said dough from sticking to said cylinder upon said pressing.

18. A method according to claim 17 further comprising the step of:

receiving said amount of said dough into a measuring cup.

19. A method according to claim 18 further comprising the steps of:

sliding said measuring cup containing said amount of dough, and releasing said amount of dough from said measuring cup.

20. A method according to claim 17 further comprising the step of supplying said dough in a hopper to be drawn into said tube.

* * * * *